United States Patent [19]
Lyon

[11] Patent Number: 6,078,429
[45] Date of Patent: Jun. 20, 2000

[54] COLOR SEPARATING PRISM HAVING VIOLET LIGHT COMPONENT IN RED CHANNEL

[75] Inventor: Richard F. Lyon, Los Altos, Calif.

[73] Assignee: Foveon, Inc., Santa Clara, Calif.

[21] Appl. No.: 09/121,227

[22] Filed: Jul. 22, 1998

[51] Int. Cl.[7] .............................. G02B 27/14; G02B 1/10
[52] U.S. Cl. ........................................... 359/634; 359/583
[58] Field of Search ................................... 359/634, 583, 359/629

[56] References Cited

U.S. PATENT DOCUMENTS

| | | | |
|---|---|---|---|
| 3,602,637 | 8/1971 | Katsuta et al. ..................... | 178/5.4 ST |
| 3,653,748 | 4/1972 | Athey ...................................... | 350/171 |
| 3,659,918 | 5/1972 | Tan ......................................... | 350/166 |
| 3,922,069 | 11/1975 | Kishikawa et al. ..................... | 350/173 |
| 4,268,119 | 5/1981 | Hartmann ................................ | 350/173 |
| 4,547,074 | 10/1985 | Hinoda et al. ........................... | 356/405 |

OTHER PUBLICATIONS

Blanksby et al, *Noise Performance of a Color CMOS Photogate Image Sensor*, IEDM 97–205 pp.8.6.1–8.6.4 (1997).

Juenger, Andrew K., *Color Sensitivity Selection for Electronics Still Cameras Based on Noise Considerations in Photographic Speed Maximization*, IS&T's 1998 PICS Conference.

Hunt, R. W. G., *The Reproduction of Colour*, Fifth Edition, Fountain Press, Kingston–upon–Thames, 1995 (Ch. 19, especially 19.12 and figure 19.9).

*Primary Examiner*—Ricky Mack
*Attorney, Agent, or Firm*—Carr & Ferrell LLP

[57] ABSTRACT

A color separating prism is disclosed for use in an electronic imaging systems such as a video or digital still-image camera. The prism separates an incoming light beam into red, green and blue light components and directs the separated light components onto adjacent imaging sensors. Beam-splitting interfaces of the prism are optically configured to admit approximately ten to twenty percent of a violet light contained in the incoming light beam into the red color channel. The prism may beneficially be optically coupled to a light-rejecting filter or mirror which rejects undesired far-red, far-violet and blue-green components of the light beam. In this manner, the resultant red, green and blue channels approximate a set of substantially non-negative color matching functions to facilitate highly colorimetrically accurate color imaging and thereby reduce or eliminate the need for post-imaging color correction.

15 Claims, 7 Drawing Sheets

PrismtoRGB709 =

| % | R | G | B | 709 |
|---|---|---|---|---|
| | 1.000 | −0.163 | −0.007 | % Prism R |
| | −0.455 | 1.000 | −0.094 | % Prism G |
| | −0.066 | −0.167 | 1.000 | % Prism B |

COLOR SEPARATING PRISM HAVING VIOLET LIGHT COMPONENT IN RED CHANNEL

BACKGROUND OF THE INVENTION

1. Field of the Invention

The present invention relates to prisms, and more particularly to a color-separating prism for use in an electronic imaging system such as a digital camera.

2. Background of the Invention

Electronic color imaging devices, such as video cameras or digital still cameras, typically record color images by independently sensing the scene to be recorded in red (long wavelength), green (medium wavelength) and blue (short wavelength) color channels. Such devices conventionally employ a prism to separate an incoming light beam into red, green, and blue color components, and to direct these components onto corresponding sensors. Signals generated by the sensors are then stored and subsequently utilized to reproduce the recorded scene.

In order to achieve colorimetrically accurate imaging in imaging devices of the foregoing description, the sensitivity curves associated with the color channels must closely approximate a set of color matching functions. A departure from this condition may result in color reproduction errors wherein colors that appear alike to a viewer's eye are reproduced differently, or colors which appear differently to a viewer's eye are reproduced as identical colors. Color reproduction errors may be particularly undesirable in certain types of print media. For example, a photograph of an article of clothing printed in a catalog may depict the clothing as having a certain hue which departs significantly from actuality, thereby leading to dissatisfied customers and returned merchandise. Color reproduction errors may be reduced by making post-imaging adjustments with color correction equipment; however, such equipment is expensive, and its operation is time-consuming and complex.

Numerous references disclosing color-separating prism designs appear in the prior art. These references have uniformly taught away from attempting to approximate the relatively complex, multi-peaked spectral distributions represented by color matching functions, and have instead taught the use of dichroic or filter elements which separate the incoming light into components individually comprising sharply defined bands or ranges of wavelengths. For example, U.S. Pat. No. 3,659,918 to Tan teaches a prism in which "light within a given wavelength range [is] reflected at each respective layer." Similarly, U.S. Pat. No. 4,268,119 to Hartmann teaches a color separation system having a sharp cutoff between the color components, with the transmittance curve for each component rising from 10% to 90% of peak transmittance over a spectral range of only about 20 nm. Applicant has found that color separation prisms used in commercially available imaging systems typically exhibit the sharply-defined flat-topped spectral response taught by the aforementioned patent prior art. Consequently, the spectral sensitivities of these imaging systems depart substantially from color matching functions, thereby causing color reproduction errors.

In view of the foregoing discussion, there is a need in the color imaging art for a color separating prism which generates red, blue and green color channels having spectral sensitivities approximating a set of color matching functions. Utilization of a prism of this description will enable highly colorimetrically accurate color imaging and thereby minimize or eliminate color reproduction errors.

SUMMARY OF THE INVENTION

The present invention provides a color separating prism which is adapted to admit a portion of a violet light component of the incoming light beam into the red light channel to thereby enable approximation of a set of substantially nonnegative color matching functions.

The prism includes an entrance face for receiving an incoming light beam, a plurality of beam splitting interfaces for separating the incoming light beam into constituent red, green, and blue light components, and three exit faces, from which the separated light components exit the prism. The prism may be optically coupled to a light-rejecting mirror or filter disposed upstream of the prism and which rejects undesired far-red, far-violet, and excess blue-green (teal) components of the incident light beam so as to tailor the overall spectral response.

According to a first embodiment of the invention, the prism is provided with first and second dichroic mirrors disposed respectively at first and second beam splitting interfaces. The first dichroic mirror is optically configured to reflect most of the red light component, very little green light, and approximately ten to twenty percent of the violet light component of the incident light beam. It is noted that the term "violet" is used herein to mean a band of light at the short-wavelength end of the visible spectrum, overlapping the band referred to as "blue" but having an average wavelength that is somewhat shorter than the average wavelength of the blue band. The reflected light, which constitutes the red light component, is then directed to the corresponding exit face of the prism. The second dichroic mirror is configured to separate the light transmitted by the first dichroic mirror into blue and green light components, which are subsequently directed to corresponding exit faces of the prism. The reflectance characteristics of the first and second dichroic mirrors are chosen such that the resultant set of spectral sensitivities associated with the color channels approximates a set of substantially non-negative color matching functions. In this manner, highly colorimetrically accurate color imaging may be advantageously achieved.

DETAILED DESCRIPTION OF THE INVENTION

The present invention relates to a color separating prism for an imaging system having three color channels in which a portion of the violet component of the incoming light beam is admitted into the red channel, thereby permitting the spectral sensitivities of the three color channels to approximate color matching functions. The term "channel", as used herein, denotes both a path of a light component and the sensor at which the light path terminates. The following description is presented to enable one of ordinary skill in the art to make and use the invention and is provided in the context of a patent application and its requirements.

Figure 1:
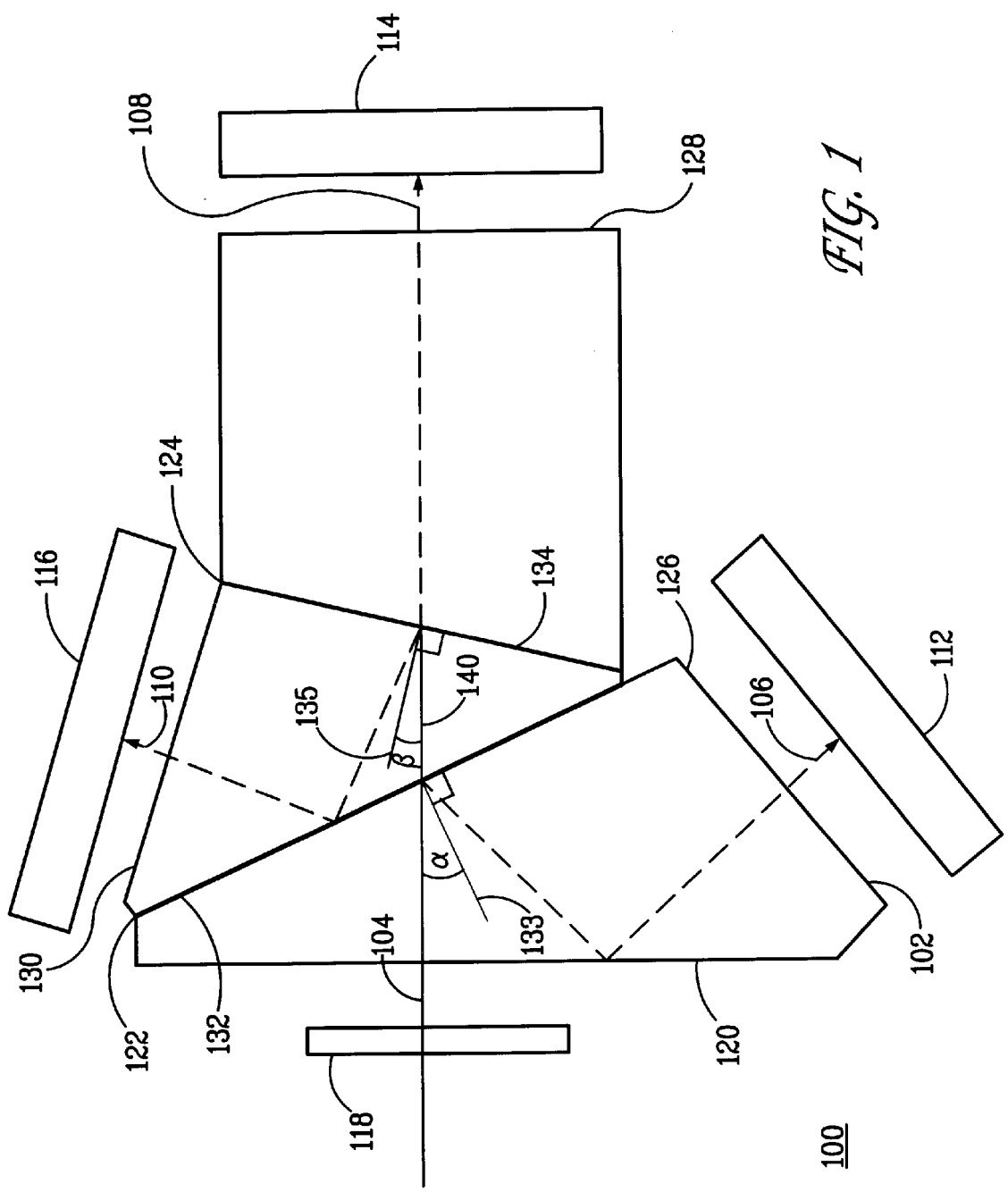
FIG. 1 is a schematic of an imaging system employing a color separating prism according to a first ("red-first") embodiment of the present invention, showing in particular the light rejecting means, prism and sensors.

Reference is initially directed to FIG. 1, which schematically depicts an imaging system 100 including a prism 102 of the present invention configured to separate an incoming light beam 104 into red 106, green 108, and blue 110 light components and to direct each of the components along respective paths to be incident upon a corresponding sensor 112, 114, or 116. One or more focussing elements (not shown), will typically be disposed in the path of the incident light beam 104 upstream of the prism 102 so as to focus the light components 104, 106 and 108 onto their respective sensors. Light rejecting element 118, which may comprise a filter or mirror, may also be disposed in the path of the light beam 104 upstream of prism 102 to reject undesirable components of the beam. The function of light rejecting element 118 is discussed below in further detail in connection with FIG. 6.

Prism 102 is provided with an entrance face 120, first and second beam splitting interfaces 122 and 124, and first, second and third exit faces 126, 128, and 130. Incoming light beam 104 enters prism 102 via entrance face 120 and then traverses a path extending between entrance face 120 and first beam splitting interface 122. A first dichroic mirror 132 disposed at the first beam splitting interface 122 and having a surface normal 133 inclined at an angle α relative to incoming beam 104 is optically configured to reflect a first component of the light and transmit a second component of the incoming light beam. As will be discussed in further detail hereinbelow, first dichroic mirror 132 has a characteristic transmittance curve (fraction of light transmitted as a function of wavelength) which, taken together with second dichroic mirror 134 and other elements of imaging system 100, cause the blue, green, and red channel spectral sensitivities to approximate color matching functions.

In accordance with the first embodiment of the invention, the light component reflected by first dichroic mirror 132 is deemed the red light component 106. Red light component 106 comprises most of the red (long wavelength) light of the incoming light beam, very little of the green light, and approximately ten to twenty percent of the violet (very short wavelength) light. The first embodiment of the prism 102 is thus referred to herein as the "red-first" prism. Red light component 106 subsequently undergoes total internal reflection at entrance face 120 and is directed to exit face 126 from which red light component 106 exits prism 102.

The component 140 of the incoming light beam 104 transmitted by first dichroic mirror 132 traverses a second portion of prism 102 and encounters second beam splitting interface 124. Second beam splitting interface 124 has disposed therein a second dichroic mirror 134 having a surface normal 135 inclined at an angle β relative to transmitted component beam 140. Second dichroic mirror 134 is configured to reflect a first component of the light incident thereon and transmit a second component. In accordance with the "red-first" embodiment of the prism, second dichroic mirror reflects blue light component 110 and transmits green light component 108. It is to be appreciated that blue light component 110 includes the remaining 80 to 90 percent of the violet light not admitted into in the red light component 106, as described above. Blue light component 110 subsequently undergoes total internal reflection at an air gap in beam splitting interface 122 and is directed to exit face 130 from which blue light component 110 leaves prism 102. Green light component 108, which is transmitted by second dichroic mirror 134, traverses a third portion of prism 102 and is directed to exit face 128, from which green light component 108 exits prism 102.

Sensors 112, 114, and 116 are positioned proximal respective exit faces 126, 128, and 130. As is known in the art, each of the sensors is operative to generate a signal responsive to the pattern of light incident on the sensor, the signal being representative of the component of the image being recorded which falls within the corresponding color channel. In commercially available imaging systems such as digital cameras or camcorders, sensors 112, 114, and 116 will typically comprise charge coupled device (CCD) arrays. However, other types of sensors, such as CMOS sensors or Plumbicon-type tubes, may be utilized with the prism of the present invention.

It is to be appreciated that the term "prism" as used herein is intended to include an assembly of multiple prism blocks which are cemented together or otherwise mechanically associated or coupled, and is not intended to be limited to a prism having a unitary structure. It is further appreciated that the features of the present invention may be utilized with any number of prism geometries. As will be discussed below in connection with the description of the second embodiment of the prism, the sequence in which the light components are reflected (i.e. red-first vs. blue-first or green-first) may be selected to minimize polarization-related errors associated with a given prism geometry.

Figure 2:
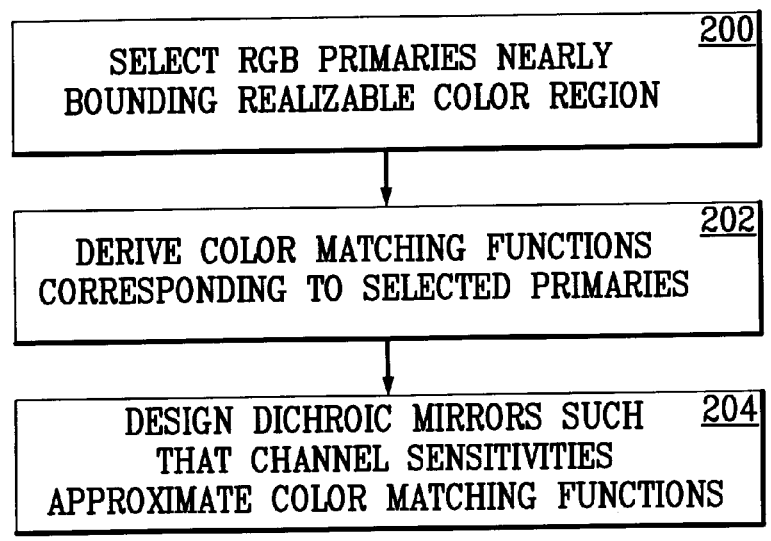
FIG. 2 is a flowchart showing the steps of a general method for designing first and second dichroic mirrors to produce a desired color separation.

As is alluded to hereinabove, an essential requirement of the present invention is to design dichroic mirrors which cause the spectral sensitivities associated with the three color channels to approximate color matching functions. FIG. 2 is a flowchart depicting the general steps of a preferred method for designing the dichroic mirrors according to the present invention. Initial step 200 comprises selecting an appropriate set of red, green and blue primaries. As is known in the electronic color imaging art, it is not necessary to approximate the color-matching functions corresponding to a set of monitor primaries, because the signals generated by sensors 112, 114, and 116 can be matrixed (i.e., converted to standard RGB signals by multiplying the set of measured signals by a matrix). It is thus possible to select a set of primaries having color matching functions which possess desirable properties or characteristics. For example, a set of primaries may be selected which correspond to a set of all-positive or particularly narrow color matching functions. However, selection of a set of primaries having large off-diagonal coefficients in the associated conversion matrix (termed a "harsh" matrix) is disfavored, since this condition will have an adverse effect on the imaging system's signal to noise ratio. To optimize the selection process, both the properties of the color matching functions associated with a set of primaries and the magnitude of off-diagonal components in the corresponding conversion matrix should be considered.

Figure 3:
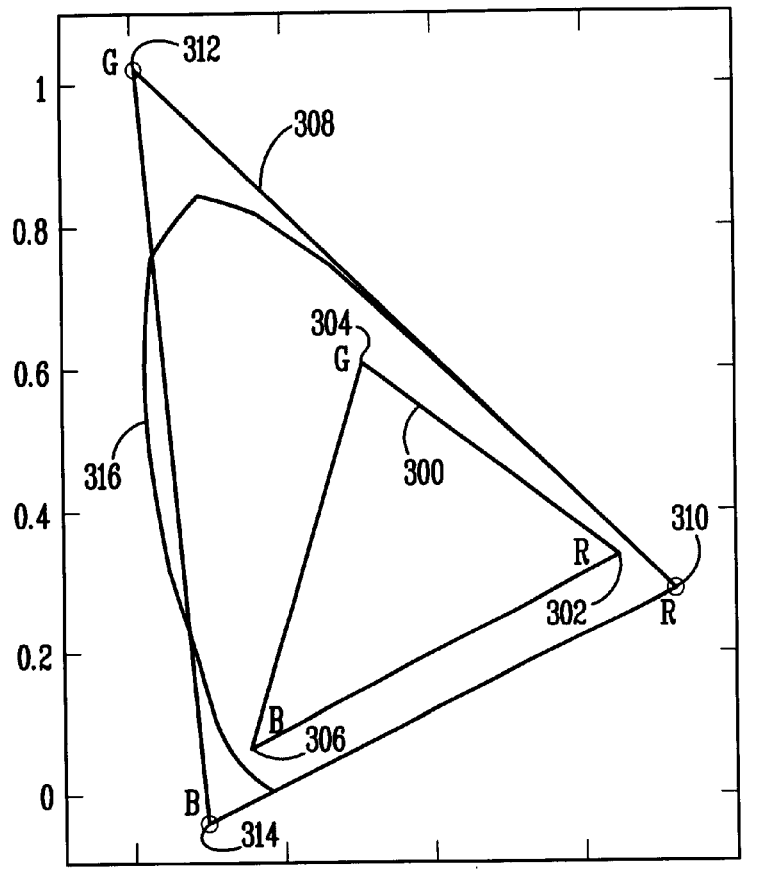
FIG. 3 is a graph of x-y chromaticity space showing the relationship of the selected red, green, and blue primaries to the spectral color trajectory and to a standard set of monitor primaries.

FIG. 3 depicts a graph of CIE x-y chromaticity space in which are drawn a first triangle 300 defined by red 302, green 304, and blue 306 monitor primaries (using the standard primaries known as Rec. 709 for this example), a second triangle 308 defined by red 310, green 312 and blue 314 primaries selected in accordance with the present invention, and a curve 316 depicting the trajectory of pure spectral colors. It is noted that curve 316 is substantially (but not entirely) enclosed by triangle 308, indicating that the color matching functions corresponding to selected primaries 310, 312, and 314 are substantially non-negative. It is further noted that selected primaries 310, 312, and 314 are spaced closer to the standard primaries than are the CIE XYZ primaries located at (0,0), (0,1) and (1,0) in x-y chromaticity space) or the primaries associated with the narrowest set all-positive color matching functions described in Hunt, *The Reproduction of Color*, Section 19.12 (Fountain Press 1995). The closer spacing results in a conversion matrix, depicted in FIG. 4(*b*), which contains smaller off-diagonal elements than those corresponding to the XYZ primaries or the primaries described by Hunt (and thus has less degradation of the signal-to-noise ratio associated therewith).

Figures 4A, 4B:
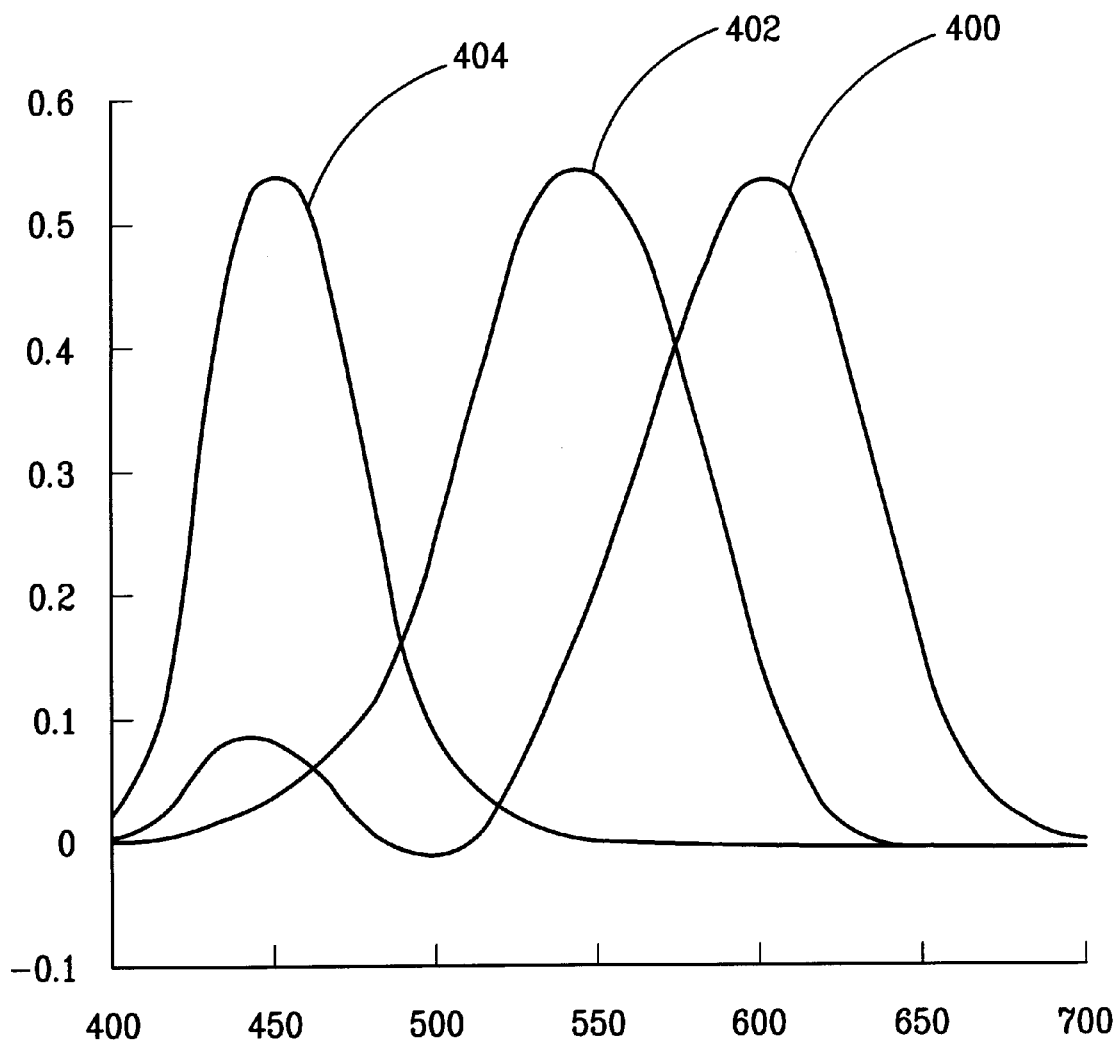
FIG. 4(a) is a graph of a set of color matching functions derived from the selected red, green, and blue primaries.
FIG. 4(b) shows the matrix for conversion from the selected primaries to the standard red, green, and blue monitor primaries.

In the next step 202, the color matching functions corresponding to selected primaries 310, 312, and 314 are generated. Those skilled in the art will recognize that given a set of primaries, the associated color matching functions may be derived by well-established methods that need not be described in detail herein. FIG. 4(*a*) shows the red 400, green 402, and blue 404 color matching functions corresponding to the selected primaries 310, 312, and 314. It is noted that the color matching functions are substantially non-negative, with only a small, slightly negative region occurring in red color matching function 400 around 500 nanometers. It is further noted that the red color matching function 400 exhibits a multipeaked spectral distribution, having a secondary peak located in the violet (very short wavelength) region. Thus, approximation of the red color matching function 400 in imaging system 100 requires that a portion of the violet light in the incoming light beam 104 be admitted into the red color channel.

Figure 5:
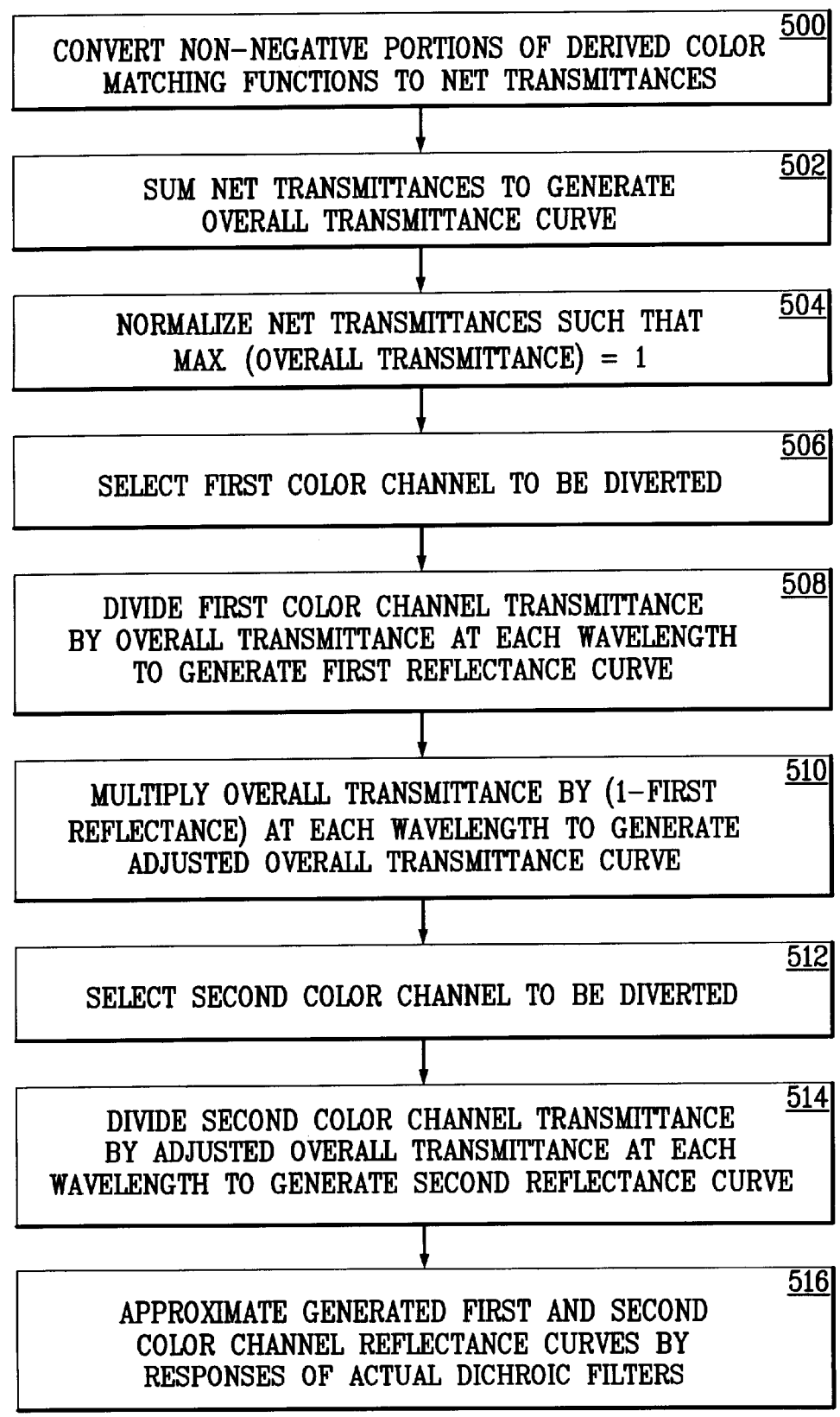
FIG. 5 is a flowchart showing the steps of a method for factorizing the derived color matching functions into the physical dichroic mirror designs.
Figure 6:
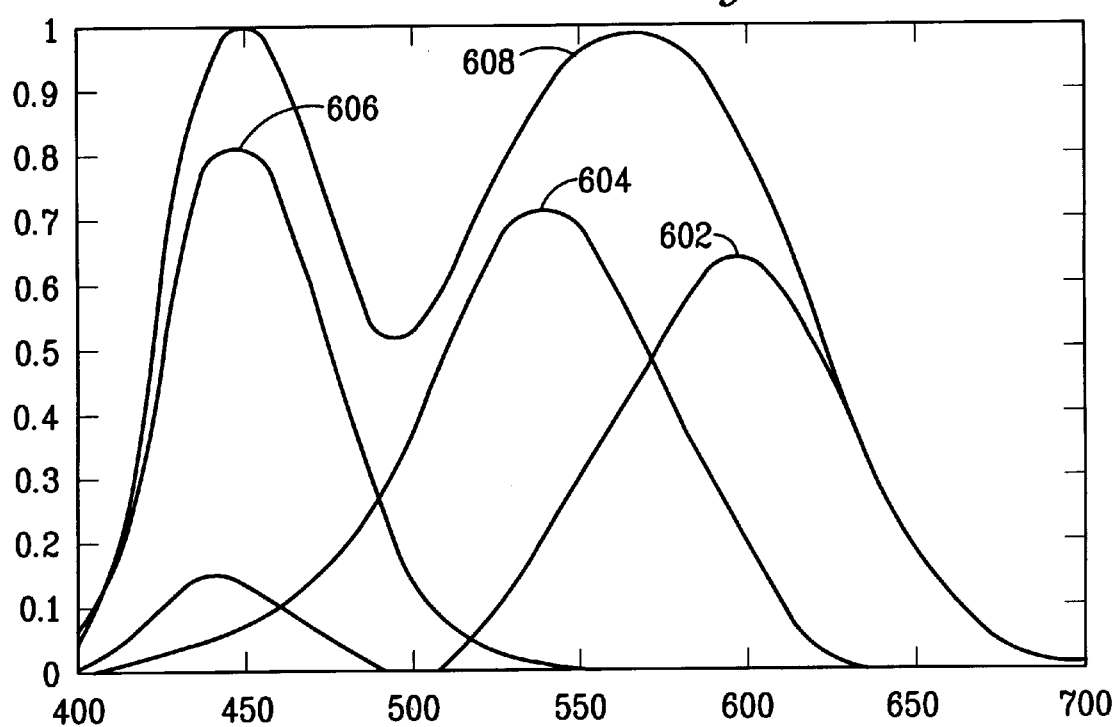
FIG. 6 is a graph showing the net transmittances of the red, green and blue color channels and the sum thereof as a function of wavelength.

FIG. 5 depicts the steps of a method for designing the first and second dichroic mirrors 132 and 134 such that the spectral sensitivities of the red, green, and blue color channels of imaging system 100 approximate the derived color matching functions 400, 402, and 404. In initial step 500, the non-negative portions of color matching functions 400, 402, and 404 are converted to corresponding net transmittances by correcting for the wavelength dependence of the sensitivities of sensors 112, 114, and 116. The relationship of sensitivity to wavelength varies according to the type and operational characteristics of the sensor. For the purposes of this disclosure, the sensitivities of sensors 112, 114, and 116 are assumed to be proportional to wavelength. After converting to net transmittances by correcting for sensor wavelength dependency, the net transmittances are then scaled such that their sum (overall filter transmittance) has peaks near 1.0, steps 502 and 504. The resultant scaled red 602, green 604, and blue 606 net transmittances and the overall filter transmittance 608 (sum curve) are depicted in FIG. 6.

Light rejecting means 118, comprising a dichroic mirror or filter, may be utilized in imaging system 100 to implement the cutoffs in the far-red and far-violet regions and the dip in the teal (blue-green) region of overall filter transmittance 608. Alternatively, the far-red and far-violet cutoffs may be implemented as separate filters, and the dip in the teal region may be implemented as still another filter.

Figure 7:
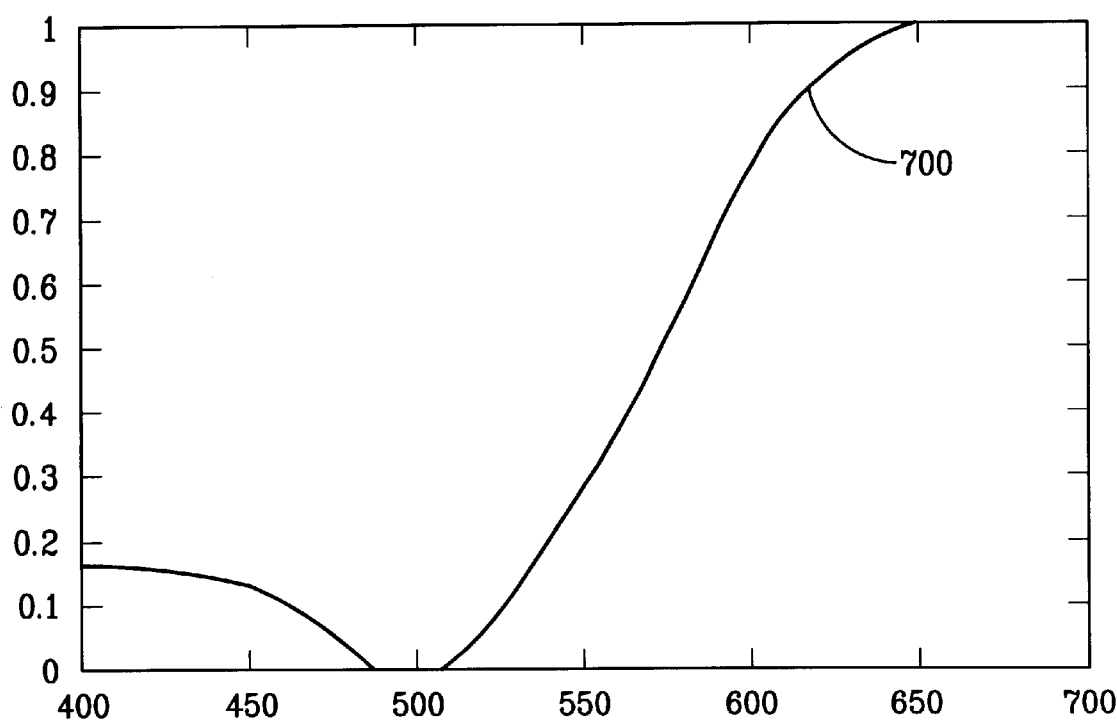
FIG. 7 is a graph of the ideal reflectance of the first dichroic as a function of wavelength for the "red-first" embodiment.

In the next step 506, the first color channel to be diverted by the prism is selected. In the first embodiment of the invention, red light component 106 is selected to be the first color channel diverted. The ideal reflectance curve for first dichroic mirror 132 is derived by dividing at each wavelength the red channel net transmittance 602 by the overall filter transmittance 608. The resultant ideal reflectance curve for the first dichroic mirror is shown as curve 700 in FIG. 7. It is to be appreciated that, as may be discerned by reference to ideal reflectance curve 700, first dichroic mirror 132 ideally reflects approximately 15% of the light in the very-short wavelength (violet) region.

Figure 8:
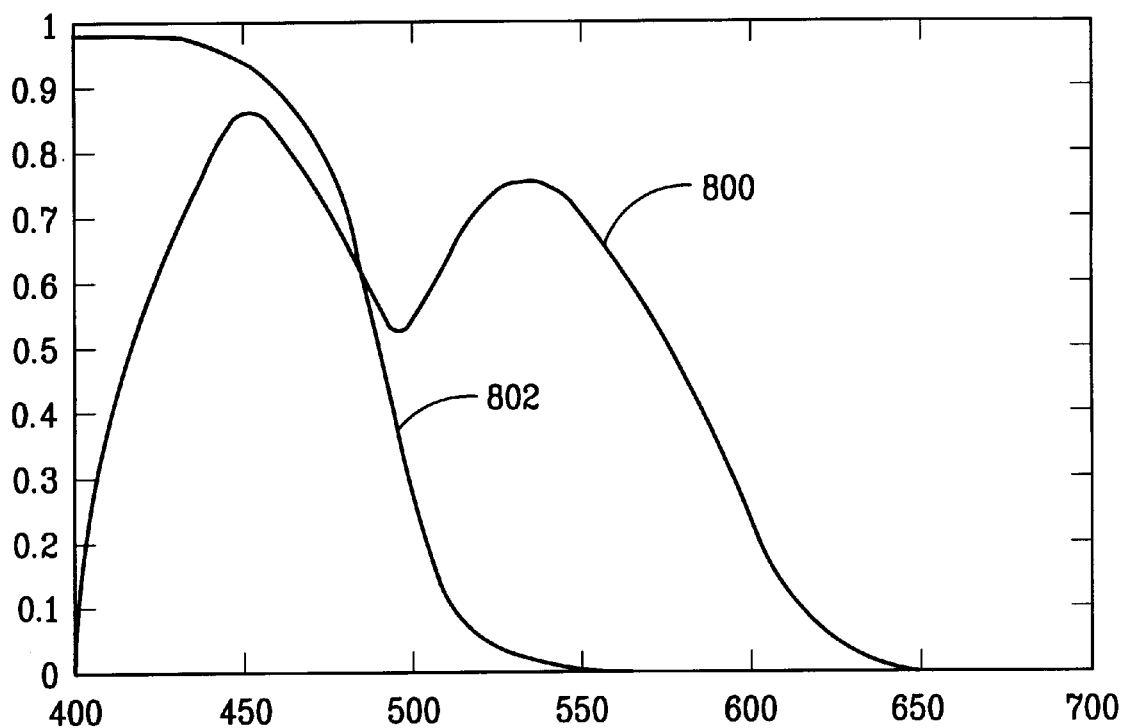
FIG. 8 is a graph of the ideal reflectance of the second dichroic as a function of wavelength for the "red-first" embodiment.

Next, in step 510, an adjusted overall transmittance to the location of second dichroic mirror 134 is calculated by multiplying at each wavelength the overall filter transmittance 608 by the first dichroic mirror transmittance (1-first dichroic mirror reflectance, curve 700). The adjusted overall transmittance is depicted as curve 800 in FIG. 8. The blue channel net transmittance 606 is then divided at each wavelength by the adjusted overall transmittance 800 to obtain the ideal reflectance of second dichroic mirror 134, step 514. The resultant ideal reflectance for second dichroic mirror 134 is depicted as curve 802 in FIG. 8. It is noted that if it was desired to reflect green light component 108 rather than blue light component 110 at second dichroic mirror 134, then the ideal reflectance of the second dichroic mirror would be the complement of the ideal reflectance depicted as curve 802.

The derived ideal reflectances 700 and 802 are then utilized to generate a physical design for first and second dichroic mirrors 132 and 134, step 516. Dichroic mirrors comprise a plurality of dielectric layers. Those skilled in the art will recognize that an ideal reflectance curve may be approximated by adjusting the total number of dielectric layers and the thicknesses and compositions of individual dielectric layers. Commercial software tools, such as TF_Calc, are available to provide as output a physical design (including the number, thickness and composition of dielectric layers) for a dichroic mirror based on an inputted desired reflectance curve. Applicant has found that it is possible to adequately approximate ideal reflectance curves 700 and 802 by using designs of dichroic mirrors having fewer than 20 dielectric layers.

Figure 10:
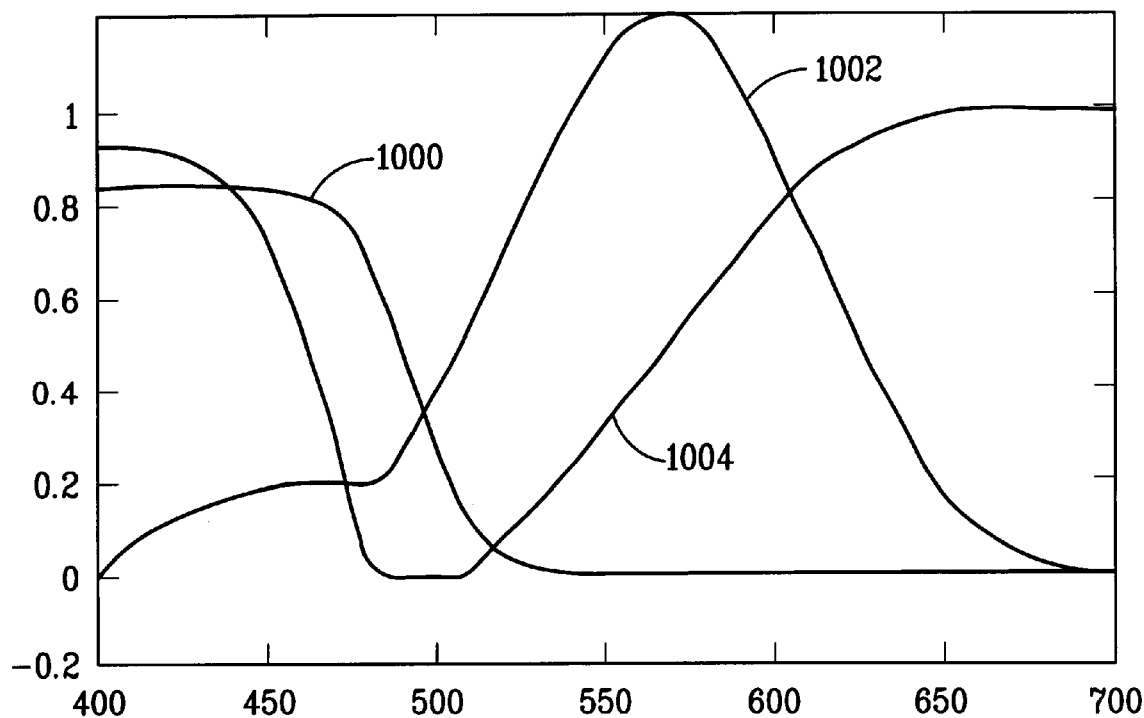
FIG. 10 is a graph of the ideal reflectances of the first and second dichroics as a function of wavelength for the "blue-first" embodiment.
Figure 9:
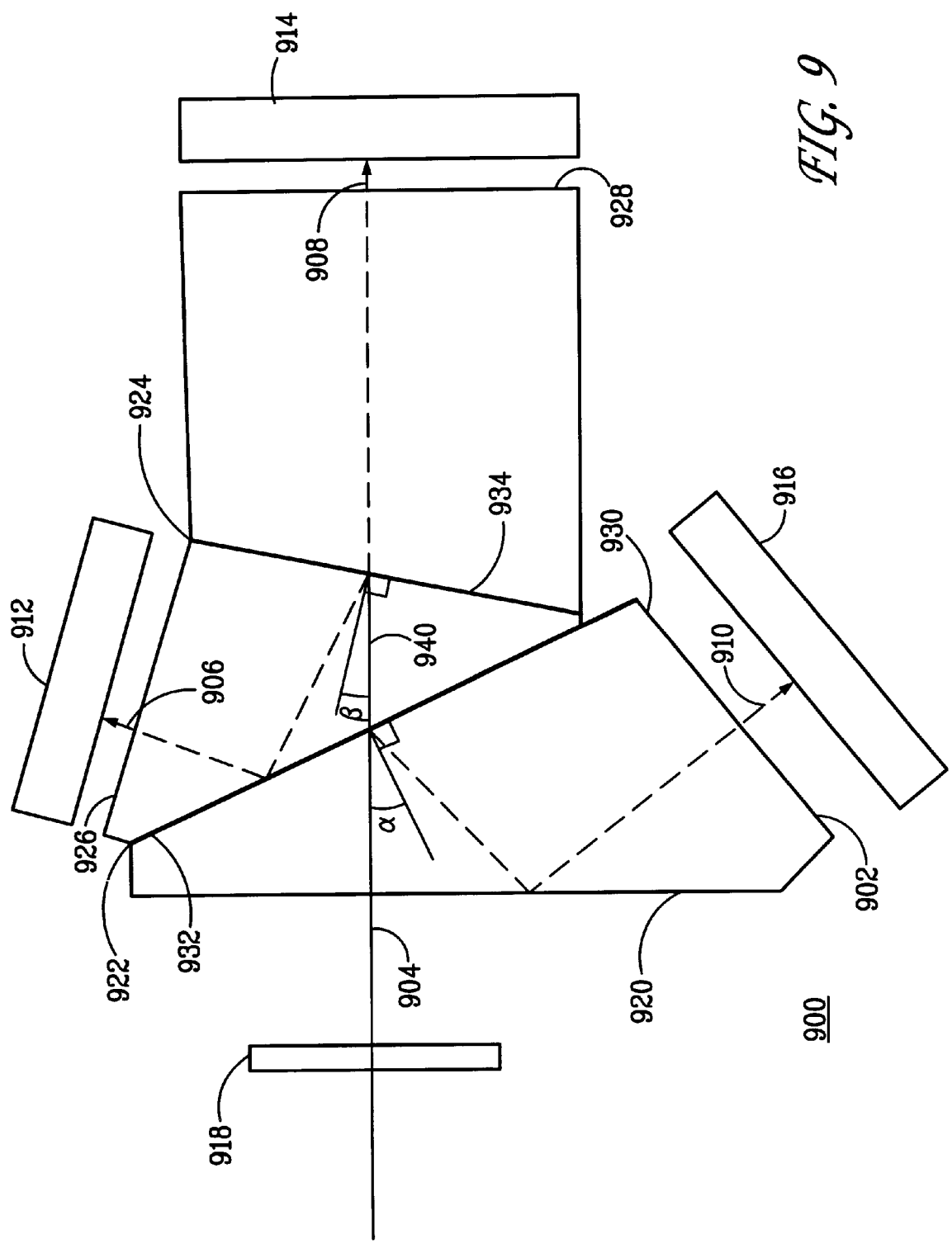
FIG. 9 is a schematic of an imaging system employing a color separating prism according to a second ("blue-first") embodiment of the present invention, showing in particular the light rejecting means, prism and sensors.

FIGS. 9 and 10 relate to a second embodiment of the invention, wherein the blue component is separated from the incoming light beam prior to separation of the red and green components (thus the second embodiment of the prism is herein referred to as the "blue-first" prism). Reference being directed to FIG. 9, which depicts an imaging system 900 according to the second embodiment of the invention, it is seen that that "blue-first" prism 902 is substantially conceptually identical to "red-first" prism 102 discussed hereinabove. However, blue-first prism 902 differs from red-first prism 102 with regard to the reflectance/transmittance characteristics of first and second dichroic mirrors 932 and 934 and the paths of red, green, and blue light components 906, 908, and 910. Incoming light beam 904 passes through light rejecting element 918 and enters prism 902 via entrance face 920. The light beam then encounters first dichroic mirror 932 disposed at first beam-splitting interface 922. First dichroic mirror is configured to reflect blue light component 910, which includes about 80 to 90 percent of the violet light portion of incoming light beam 904, and to transmit the remaining components of the incoming light beam. Blue light component 910 then undergoes total internal reflection at entrance face 920 and is directed to exit face 930.

Light component 940 transmitted by first dichroic mirror 932 next encounters second dichroic mirror 934 disposed at second beam splitting interface 924. Second dichroic mirror 934 is configured to reflect red light component 906 and transmit green component 908. Red light component 906 includes the 10 to 20 percent of the violet light transmitted by first dichroic mirror 932. Red and green light components 906 and 908 are then directed to their respective exit faces 926 and 928 from which they exit prism 902.

It is to be appreciated that the decision of whether to use a "red-first" or "blue-first" prism design is based on numerous considerations with respect to color accuracy, manufacturing tolerances, and prism geometry, including the angles of incidence $\alpha$ and $\beta$ (see FIG. 9). In some commercially available color separating prisms, first beam splitting interface 922 is oriented at a substantially greater angle of incidence than is second beam splitting interface 924 (i.e., $\alpha > \beta$). The magnitude of polarization dependence (difference in net transmittances for s- and p-polarized light causing polarization-dependent color shifts) associated with beam-splitting by dichroic mirrors is known to be roughly proportional to the square of the angle of incidence. It is therefore advantageous to use the "blue-first" embodiment of the prism to perform the red-green separation (which affects flesh tones and yellows, in which regions viewers are particularly sensitive to color shifts) at the second beam-splitting interface, having a lower angle of incidence, in order to minimize polarization-related color shifts in the red and green light components. In other standard prism geometries, which employ substantially equal angles of incidence at the first and second beam splitting interfaces, there is no preference with regard to the interface at which the red-green separation is effected, and thus the "red-first" and "blue-first" prism designs may be employed with comparable success.

The ideal reflectance curves of the first and second dichroic mirrors of the "blue-first" embodiment are derived in accordance with the method depicted in FIG. 5 and applied above in connection with the "red-first" prism embodiment. The ideal reflectance curve for first dichroic mirror 932 is derived by dividing at each wavelength the blue channel net transmittance 606 by the overall filter transmittance 608. The resultant ideal reflectance curve for the first dichroic mirror is shown as curve 1000 in FIG. 10.

Next, in step 510, an adjusted overall transmittance to the location of second dichroic mirror 934 is calculated by multiplying at each wavelength the overall filter transmittance 608 by the first dichroic mirror transmittance (1-first dichroic mirror reflectance, curve 1000). The adjusted overall transmittance is depicted as curve 1002 in FIG. 10. The red channel net transmittance 606 is then divided at each wavelength by the adjusted overall transmittance 1002 to obtain the ideal reflectance of second dichroic mirror 934, step 514. The resultant ideal reflectance for second dichroic mirror 934 is depicted as curve 1004 in FIG. 10. It is noted that ideal reflectance curve 1004 exhibits high values in the violet region, so that red light component 906 includes most of the violet light transmitted by first dichroic mirror 932 (i.e. the 10 to 20 percent of the violet light not admitted into blue light component 910). It is further noted that if it was desired to reflect green light component 908 rather than red light component 906 at second dichroic mirror 934, then the ideal reflectance of the second dichroic mirror would be the complement of the ideal reflectance depicted as curve 1004.

Once ideal reflectance curves 1000 and 1004 have been derived, physical designs are generated (step 516) for first and second dichroic mirrors 932 and 934 in the manner described hereinabove in connection with the first embodiment of the invention.

It will be recognized by those skilled in the art that, while the invention has been described above in terms of preferred embodiments, it is not limited thereto. Various features and aspects of the above described invention may be used individually or jointly. Further, although the invention has been described in the context of its implementation in a particular environment and for particular applications, e.g., electronic imaging applications, those skilled in the art will recognize that its usefulness is not limited thereto and that the present invention can be beneficially utilized in any number of environments and implementations. Accordingly, the claims set forth below should be construed in view of the full breadth and spirit of the invention as disclosed herein.

What is claimed is:

1. A color separating prism for an imaging system, the prism comprising:

an entrance face for receiving an incident light beam; and a plurality of beam-splitting interfaces for separating the incident light into red, green, and blue light components, and for directing the separated light components toward corresponding prism exit faces, the beam-splitting interfaces including beam-splitting elements configured to admit into the red light component a portion of a violet light contained in the incident light beam;

wherein the quantity and spectral characteristics of the portion of the violet light admitted into the red light component are selected such that resultant spectral sensitivity curves corresponding to the red, green, and blue light components substantially conform to a set of substantially non-negative color matching functions.

2. The color separating prism of claim 1, wherein the portion of the violet light admitted into the red light component is approximately ten to twenty percent of the violet light.

3. The color separating prism of claim 1, wherein the plurality of beam-splitting interfaces comprise a first beam splitting interface having a first dichroic mirror disposed therein, and a second beam splitting interface having a second dichroic mirror disposed therein.

4. The color separating prism of claim 1, wherein the first dichroic mirror is configured to reflect the red light component including the portion of the violet light, and to transmit the green and blue light components.

5. The color separating prism of claim 1, wherein the first dichroic mirror is configured to reflect the blue light component, and to transmit the green and red light components including the portion of the violet light.

6. The color separating prism of claim 1, wherein the set of substantially non-negative color-matching functions is derived by selecting red, green, and blue primaries which nearly bound in CIE x-y chromaticity space a spectral color region.

7. A color imaging system comprising:

first, second, and third spaced apart sensors, each sensor being operative to produce a signal characterizing a pattern of light incident thereon; and a color separating prism comprising:

an entrance face for receiving an incident light beam;

a plurality of beam-splitting interfaces for separating the incident light into red, green, and blue light components, and for directing the separated light components toward the corresponding sensors, the beam-splitting interfaces including beam-splitting elements configured to admit into the red light component a portion of a violet light contained in the incident light beam;

wherein the quantity and spectral characteristics of the portion of the violet light admitted into the red light component are selected such that resultant spectral sensitivity cues corresponding to the red, green and blue light components substantially conform to a set of substantially non-negative color matching functions.

8. The color imaging system of claim 7, wherein the first, second and third sensors comprise charge coupled device arrays.

9. The color imaging system of claim 7 further comprising light rejecting means optically coupled to the prism, the light rejecting means being configured to reject undesired far-red, far-violet and blue-green components of light incident thereon.

10. The color imaging system of claim 7, wherein the portion of the violet light admitted into the red light component is approximately ten to twenty percent of the violet light.

11. The color imaging system of claim 7, wherein the plurality of beam-splitting interfaces comprise a first beam splitting interface having a first dichroic mirror disposed therein, and a second beam splitting interface having a second dichroic mirror disposed therein.

12. The color imaging system of claim 7, wherein the first dichroic mirror is configured to reflect the red light component including the portion of the violet light, and to transmit the blue and green light components.

13. The color imaging system of claim 7, wherein the first dichroic mirror is configured to reflect the blue light component, and to transmit the green and red light components, including the portion of the violet light.

14. The color imaging system of claim 7, wherein the substantially non-negative set of color-matching functions are derived by selecting red, green, and blue primaries which nearly bound in CIE x-y chromaticity space a spectral color region.

15. A method for separating an incident light beam into three light components in an imaging system, the method comprising the steps of:

directing the incident light beam onto a first and second beam splitting interfaces configured to separate the incident light beam into red, green, and blue light components; and directing the separated red, green, and blue light components onto respective sensors;

wherein the first and second beam splitting interfaces include beam-splitting elements configured to admit into the red light component a portion of a violet light contained in the incident light beam, the quantity and spectral characteristics of the portion of the violet light being selected such that the red, green and blue light components have associated spectral sensitivities substantially conforming to a set of substantially non-negative color matching functions.

* * * * *